US008239575B2

(12) United States Patent
Perkins

(10) Patent No.: US 8,239,575 B2
(45) Date of Patent: Aug. 7, 2012

(54) METHOD, SYSTEM, APPARATUS, AND PROGRAM TO FACILITATE COMMUNICATION BETWEEN SYSTEMS

(75) Inventor: Stephen Douglas Perkins, Santa Fe, TX (US)

(73) Assignee: AvFinity, LLC, Austin, TX (US)

( * ) Notice: Subject to any disclaimer, the term of this patent is extended or adjusted under 35 U.S.C. 154(b) by 0 days.

(21) Appl. No.: 11/740,795

(22) Filed: Apr. 26, 2007

(65) Prior Publication Data
US 2007/0266084 A1 Nov. 15, 2007

Related U.S. Application Data

(60) Provisional application No. 60/796,110, filed on Apr. 28, 2006.

(51) Int. Cl.
*G06F 15/16* (2006.01)
(52) U.S. Cl. .................................... 709/246; 709/230
(58) Field of Classification Search .............. 709/236, 709/230, 246
See application file for complete search history.

(56) References Cited

U.S. PATENT DOCUMENTS

| | | | | |
|---|---|---|---|---|
| 6,615,116 B2* | 9/2003 | Ebert et al. | ........................ | 701/3 |
| 6,671,589 B2* | 12/2003 | Holst et al. | ........................ | 701/3 |
| 6,745,176 B2* | 6/2004 | Probert et al. | .................... | 707/2 |
| 6,785,730 B1* | 8/2004 | Taylor | ............................ | 709/230 |
| 6,961,776 B1* | 11/2005 | Buckingham et al. | ........ | 709/229 |
| 6,976,075 B2* | 12/2005 | Ma | ................................. | 709/228 |
| 7,072,056 B1* | 7/2006 | Greaves et al. | ............. | 358/1.15 |
| 7,272,662 B2* | 9/2007 | Chesnais et al. | ............. | 709/246 |
| 7,310,573 B2* | 12/2007 | Stickling | .......................... | 701/3 |

\* cited by examiner

*Primary Examiner* — Kristie Shingles
(74) *Attorney, Agent, or Firm* — Hulsey, P.C.; William N. Hulsey, III; Loren T. Smith

(57) ABSTRACT

The disclosed subject matter describes a method, system, apparatus, and program for interfacing multiple communication systems, comprising the following steps. The interface receives information from the client, followed by determination of the format of said information. The disclosed subject matter identifies the third party to receive the information and transforms the originally received information into a format compatible for the third party. The server then sends the converted information to the intended third party. The associated process allows communication between the client and third party in both directions.

21 Claims, 9 Drawing Sheets

METHOD, SYSTEM, APPARATUS, AND PROGRAM TO FACILITATE COMMUNICATION BETWEEN SYSTEMS

This application claims the benefit of priority to U.S. Provisional Patent Application No. 60/796,110 entitled "METHOD AND SYSTEM FOR MANAGER FOR TRANSPORTATION MESSAGES," by John Green filed on Apr. 28, 2006, and is incorporated herein by reference in its entirety for all purposes.

TECHNICAL FIELD OF THE INVENTION

The disclosed subject matter relates to the interconnectivity of communication systems. Specifically, the disclosure teaches how to create an interface that interacts with other communication systems where said communication systems require a specific format to send and receive information.

BACKGROUND OF THE INVENTION

An initial problem when new technologies develop is the lack of standardization. Different developers in technology arbitrarily set up the structure their technologies follow with little input from outside developers. As time passes, the industry generally comes to a consensus as to standards that the related technologies should follow. When standardization begins, disruptions tend to occur with the existing technology. These range from mild inconvenience to catastrophic failures depending on the technology in question.

Alternatively, when new technologies develop, inventors consciously make the invention different from an accepted standard. The reasons range from a previously unaddressed deficiency in the existing technology to the need to establish a propriety right in the technology format.

Regardless of the reason, different technological standards can lead to interoperability problems. For purposes of this discussion, the technology in this particular embodiment of the disclosed subject matter will relate to communication systems involved in the aviation industry.

Since the beginning of the aviation industry, there have been communication networks between the aircraft and airports. These networks utilize AFTN (Aeronautical Fixed Telecommunications Network) to relay communications between airports. AFTN is made up of various organizations, including ANS (Air Navigation Service) providers, aviation service providers, airports, and government entities. Communication occurs over various means, including VHF transmitters and satellites. Messages relayed over these systems range in importance from urgent distress calls to administrative messages. These networks communicate using the airline teletype system in IATA (International Air Transport Association) TypeB format (hereinafter referred to as TypeB).

TypeB formatted messages are based on technology that is several decades old and prevalent in the industry. Due to the reliable nature and established legacy of TypeB, newer participants in the airline industry maintain compatibility with TypeB. TypeB communications connect not just critical parties like air traffic control and aircraft, but also gate crews, baggage handlers, hotels, auto rental agencies, suppliers, U.S. Customs APIS (Advanced Passenger Information System), flight crews, and automated passenger manifest databases.

TypeB represents just one example of the preexisting communication systems that currently exist in aviation communications. Other systems used in the aviation industry include facsimile, Telex, Internet-based email, and others known to those skilled in the art. Each of these communication systems has their own unique formats.

As mentioned earlier, communication systems in the aviation industry connect more than just various airports. Communications exist between travel agents and airlines for booking passengers on various flights. In the United States, this is done through the Airlines Reporting Corporation, through IATA and through ICAO (International Civil Aviation Organization) throughout a majority of the world. Newer systems include APIS, which can relay information on all passengers on a flight. Similar systems can transmit information such as special needs of various passengers (based on disability, age, medical status, etc).

Additionally, communications channels exist between the airports and the aircraft coordinated by those airports. Information transmitted by them includes flight plans that detail the intended flight path of the aircraft, take off weight, fuel, and other necessary information. Flight data recorder systems also contain functionality that provides real time telemetry over communication systems to various parties while the plane operates.

With all of these different communication systems, compatibility issues arise. An example illustrates potential issues. For the purpose of this example, none of the following systems are compatible. A travel agent makes all the reservations for passengers on a plane. The airline receives the information via system A. System B receives all the information on cargo the plane will carry. Once at the airport, the airline inputs all of the passenger information to the airport via system C. System D receives from the airline the projected flight plan. The air traffic controllers relay the information about the plane's contents to the regulatory authority via System E and coordinate the flight plan via System F. If the plane needs to receive any information while in route, the plane receives the information over System G. This example shows seven systems with seven different communication protocols are needed for a single flight. With seven different systems that cannot talk directly to each other, people relay messages from one system to another. This introduces a possibility of user error in the message transmission.

The preceding text illustrates how many different communications systems interact in the aviation industry. As mentioned before, the aviation industry still uses the TypeB radio teletype alongside systems that relay messages via satellite. This duality exists because many places are unable or unwilling to upgrade their existing communication equipment.

Part of this resistance to upgrading comes from the expense of the process. Many of these systems are spread all over the world. Instead of one location replacing one piece of equipment, system overhauls would involve thousands of replacements all over the world. The volume makes such replacement cost prohibitive. The operators would rather bear the periodic expense of replacing a failed system to a massive overhaul of the basic technology.

Another reason for the lack of upgrading comes from the aforementioned disruption when such a changeover occurs. Given the complexity of the existing aviation communication network, a slight disruption could have catastrophic consequences. Planes could enter each other's safe areas causing collisions due to miscommunication.

A need exists for simplifying the interconnectivity between these communication systems. Instead of the aviation industry clients having to use multiple communication systems, there is a need for a single point of communication that interfaces with all existing communication structures while providing minimal disruptions to preexisting communication structures. Clients need a single point of communication that allows them to send and receive information with third parties that communicate in different formats.

SUMMARY OF THE INVENTION

The method, system, and program illustrated and described herein have several features, no single one of which is solely responsible for its desirable attributes. Without limiting the scope as expressed by the description that follows, its more prominent features will now be discussed briefly. After considering this discussion, and particularly after reading the section entitled "DETAILED DESCRIPTION OF THE ILLUSTRATIVE EMBODIMENTS" one will understand how the features of the invention provide for the interconnectivity of communication systems.

The disclosed subject matter allows interconnectivity of communication systems with a minimal need to add new equipment. Older communication systems require system specific equipment to transmit or receive the information over the system. Clients still use the older systems due to prevalence in the industry. Clients using the invention will interact with these legacy systems through a general purpose computer or other device known to those skilled in the art to use the system to communicate with others as opposed to equipment or programs unique to each communication system.

This disclosed subject matter describes a method, system, apparatus, and program for interfacing multiple communication systems, comprising the following steps. The invention receives information from a communication source with the associated equipment, followed by determination of the format of said information. The server identifies the intended recipient of the information and transforms the originally received information into a format for the recipient to understand. The equipment then sends the converted information to the intended recipient. The process allows communication between the client and third party in both directions.

BRIEF DESCRIPTION OF DRAWINGS

The present invention will be described with particular embodiments thereof, and references will be made to the drawings in which.

DETAILED DESCRIPTION OF THE ILLUSTRATED EMBODIMENTS

Figure 1:
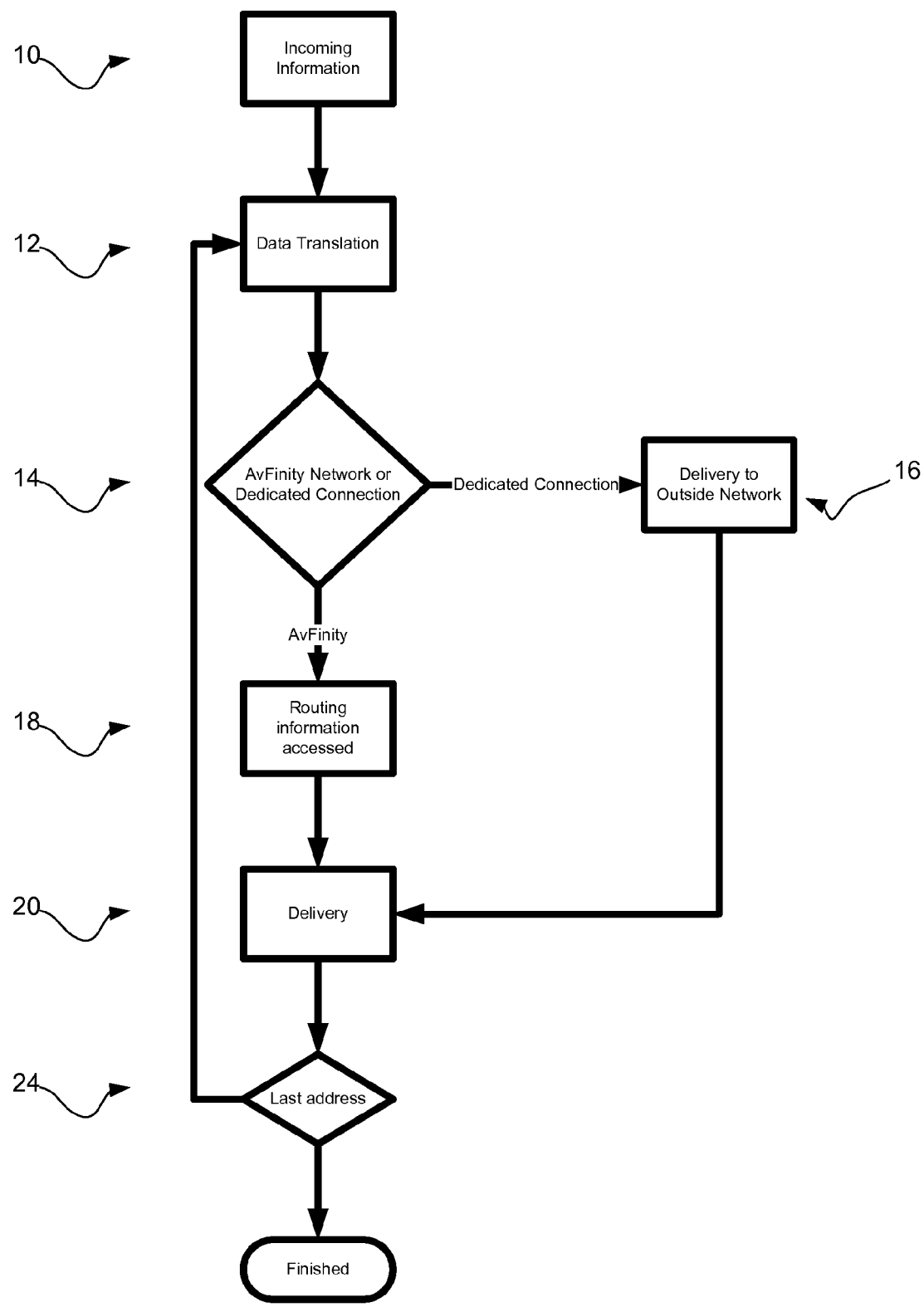
FIG. 1 presents an example of the translation and routing procedure using the example of transmission to a TypeB formatted message.

The detailed description set forth below in connection with the appended drawings is intended as a description of exemplary embodiments in which present invention can be practiced. The term "exemplary" used through this description means "serving as an example, instance, or illustration," and should not necessarily be construed as preferred or advantageous over other embodiments. The detailed description included specific details for the purpose of providing a thorough understanding of the present invention. However, it will be apparent to those skilled in the art the present invention may be practiced without these specific details. In some instances, well known structures and devices are shown in block diagrams form in order to avoid obscuring the concepts of the present invention.

Although described with particular reference to a systems environment, the claimed subject matter can be implemented in a plurality of information technology (IT) systems. Those with skill in the electronic telecommunications arts will recognize that the disclosed embodiments may be realized in ways in addition to those specific examples described below. In addition, the methods of the disclosed subject matter can be implemented using a variety of combinations of software and hardware. The hardware portion can be implemented using specialized logic; the software portion can be stored in a memory and executed by a suitable instruction execution system such as a microprocessor, PC or mainframe.

All references, including publications, patent applications, and patents, cited herein are hereby incorporated by reference to the same extent as if each reference were individually and specifically indicated to be incorporated by reference and were set forth in its entirety herein.

The disclosed subject matter may be described in the general context of computer-executable instructions, such as program modules, being executed by a computer. Generally, program modules include routines, programs, objects, components, data structures, etc. that performs particular tasks or implement particular abstract data types. The disclosed subject matter may also be practiced in distributed computing environments wherein tasks are performed by remote processing devices that are linked through a communications network. In a distributed computing environment, program modules may be located in local and/or remote computer storage media including memory storage devices.

Preferred embodiments of this disclosed subject matter are described herein, including the best mode known to the inventors for carrying out the disclosed subject matter. Variations of those preferred embodiments may become apparent to those of ordinary skill in the art upon reading the foregoing description. The inventors expect skilled artisans to employ such variations as appropriate, and the inventors intend for the disclosed subject matter to be practiced otherwise than as specifically described herein. Accordingly, this disclosed subject matter includes all modifications and equivalents of the subject matter recited in the claims appended hereto as permitted by applicable law. Moreover, any combination of the above-described elements in all possible variations thereof is encompassed by the disclosed subject matter unless otherwise indicated herein or otherwise clearly contradicted by context.

The disclosure describes a method, system, apparatus, and program for interfacing multiple communication systems. The interface receives information from the client or server, followed by determination of the format of said information. The terminal is any piece of equipment which executes the interface. On inbound information, the server is the component that receives the information from the client and transforms the information into a format compatible with the third party. The server then sends the converted information to the intended third party. The process allows communication between the client and third party in both directions.

The server allows a client to communicate over communication systems that do not follow the same format or communication protocols as the client's own communication system. The server uses any one of the available communication systems used by those skilled in that art to communicate with other communication devices and networks. By using the interface, the client can interact with communication systems that use various information formats. Any communication system can utilize the server provided the interface has been configured to process the communication from both the said third party system and said client's system. The embodiment used in this example relates to the aviation industry.

FIG. 1 is a functional block diagram of an exemplary use of disclosed subject matter in a communication environment. The client sends a message 10 which is transformed 12 into a format compatible with the third party. The system determines if the message will be sent over a dedicated connection or over the Internet 14. Third parties with a dedicated connection to the server allow the server to communicate with the third party via the dedicated connection 16. Third parties connected to the server by a dedicated connection can be the recipient of the information, or can retransmit the information to the appropriate destination.

If the third party recipient does not have a dedicated connection to the server, the server receives routing information 18 to locate the appropriate destination to deliver 20 the information via the Internet. The process repeats until the information has been converted and sent to all appropriate third parties 24.

An example of the preceding process would include a client entering the passenger list, the cargo manifest, and flight plan into the interface. The interface takes the information provided and determines which pieces of information are transmitted over the different communication systems. Once the information is properly sorted, the terminal places the information into the proper format and transmits the information to the appropriate third party. When information is sent to the third parties, the information designates the server as the sender, not the server client. Any response from the third party goes to the server, which in turn routes the response to the appropriate client.

Figure 2:
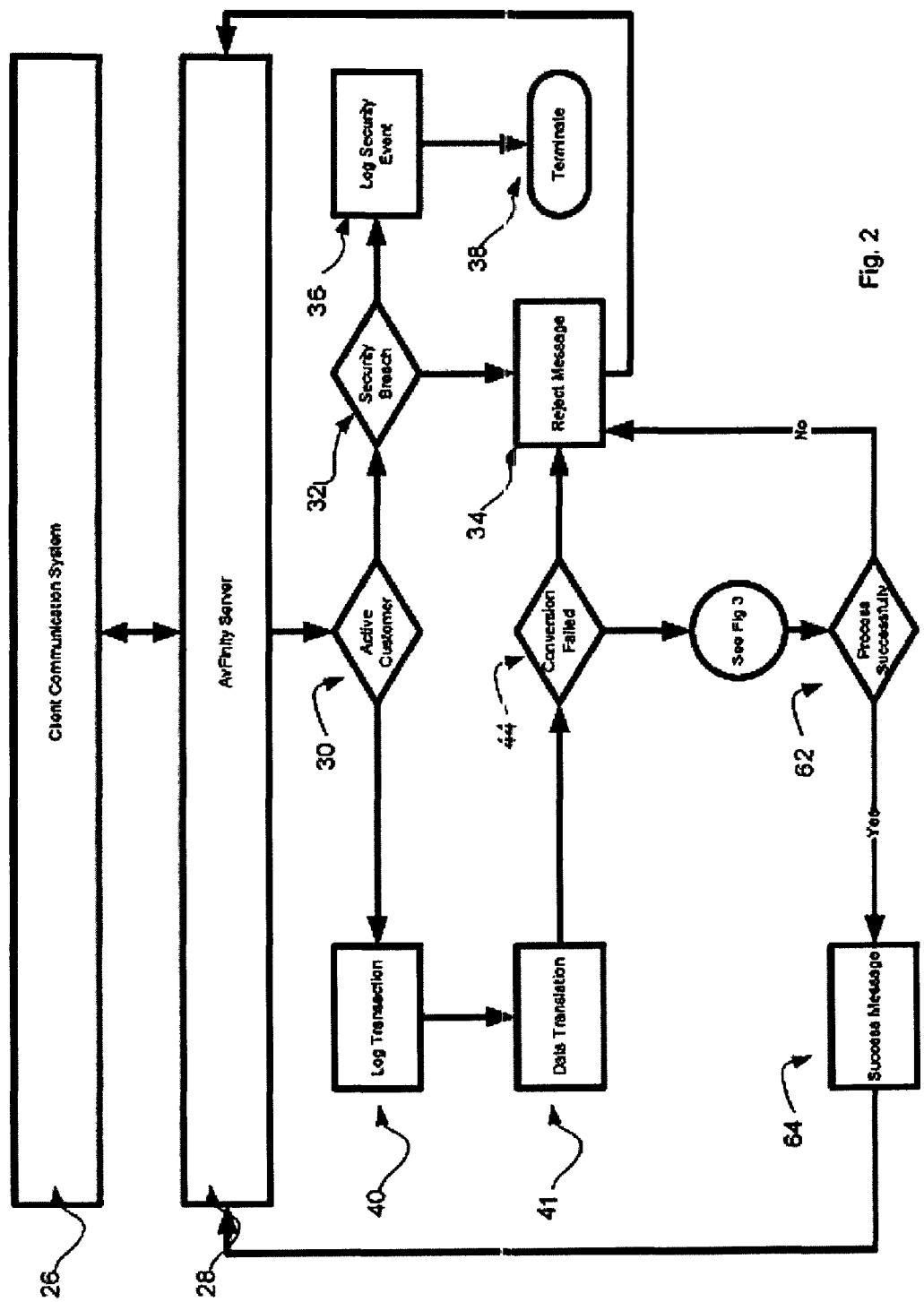
FIG. 2 shows a diagram of how customers can access the server and how messages are converted into different formats and routed to different third party communication systems.

The server illustrated in FIG. 2 represents an embodiment referenced in this disclosure. When the client uses their communication system 26 (example includes ARC (AvCentric Remote Client) or a client specific system), the server 28 receives information from the client. The server verifies the client as an active client 30. If the client is not an active customer, then there is a check to see if there has been a security breach 32. If there has been no security breach, then the client is notified of the transaction rejection 34. If there has been a security breach, the server logs the event as a security alert 36 and terminates the transaction 38.

If the server recognizes the client as an active customer 30, the server logs the transaction 40 and begins the data translation 41. The basis for the translation algorithm comes from any source available to those skilled in the art. One embodiment allows for the server to analyze the incoming communication structure and determine the needed output format. Another embodiment looks at the incoming communication and determines the needed output format based on the destination of the communication. Another embodiment has the incoming communication send a separate piece of information telling the server what format to translate the incoming communication into. In the event of an unsuccessful translation 44, the system generates a rejection message 34.

Figure 3:
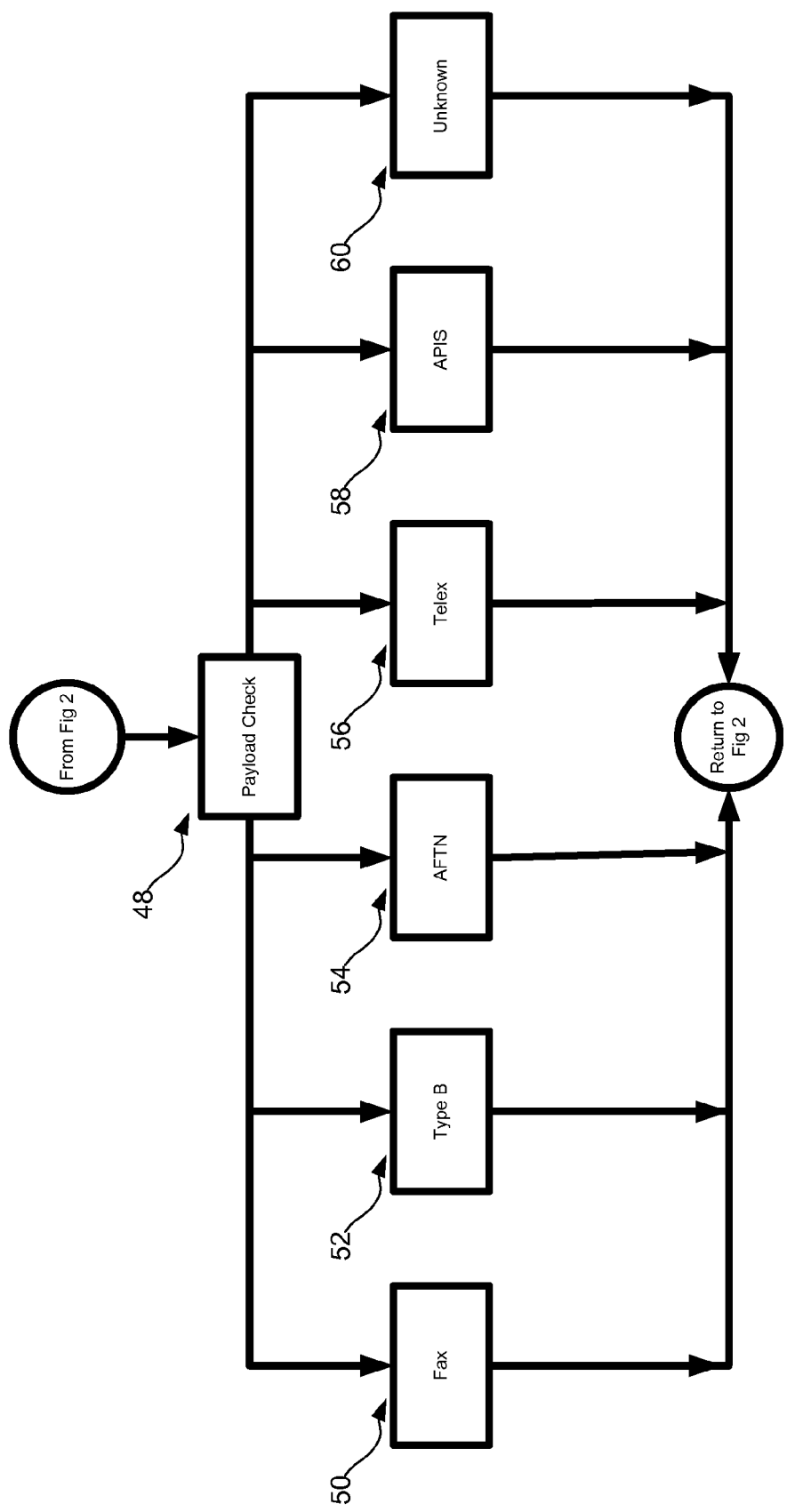
FIG. 3 illustrates how the equipment checks the message format and route the message to the appropriate third party destination.

After a successful translation, the outgoing communication then proceeds to the appropriate third party as shown in FIG. 3. The server directs the message based on the format of the message 48. Examples of these can include facsimile 50, TypeB 52, AFTN 54, Telex 56, APIS 58, or other communication formats 60 used by those in the industry. After the message transmits, the system confirms the message has been received by the third party 62 in FIG. 2. A success message 64 notifies the client if the message completed, while a rejection message 34 notifies the client if the message did not transmit properly.

The preceding disclosure related to clients communicating with third parties. The server also facilitates communication from third parties to clients and between clients. Communication from third parties allows for responses to the clients original communication or allows the third party to initiate communication with the client. The process follows the same steps as those of client initiated communication, but in reverse. The third party sends a communication to the server, which translates the communication from the third party format to the server based format. The server then sends the converted communication to the client. If a client wants to communicate with another client of the service, the server is able to route the communication in the same manner as that of a non-client.

Figure 4:
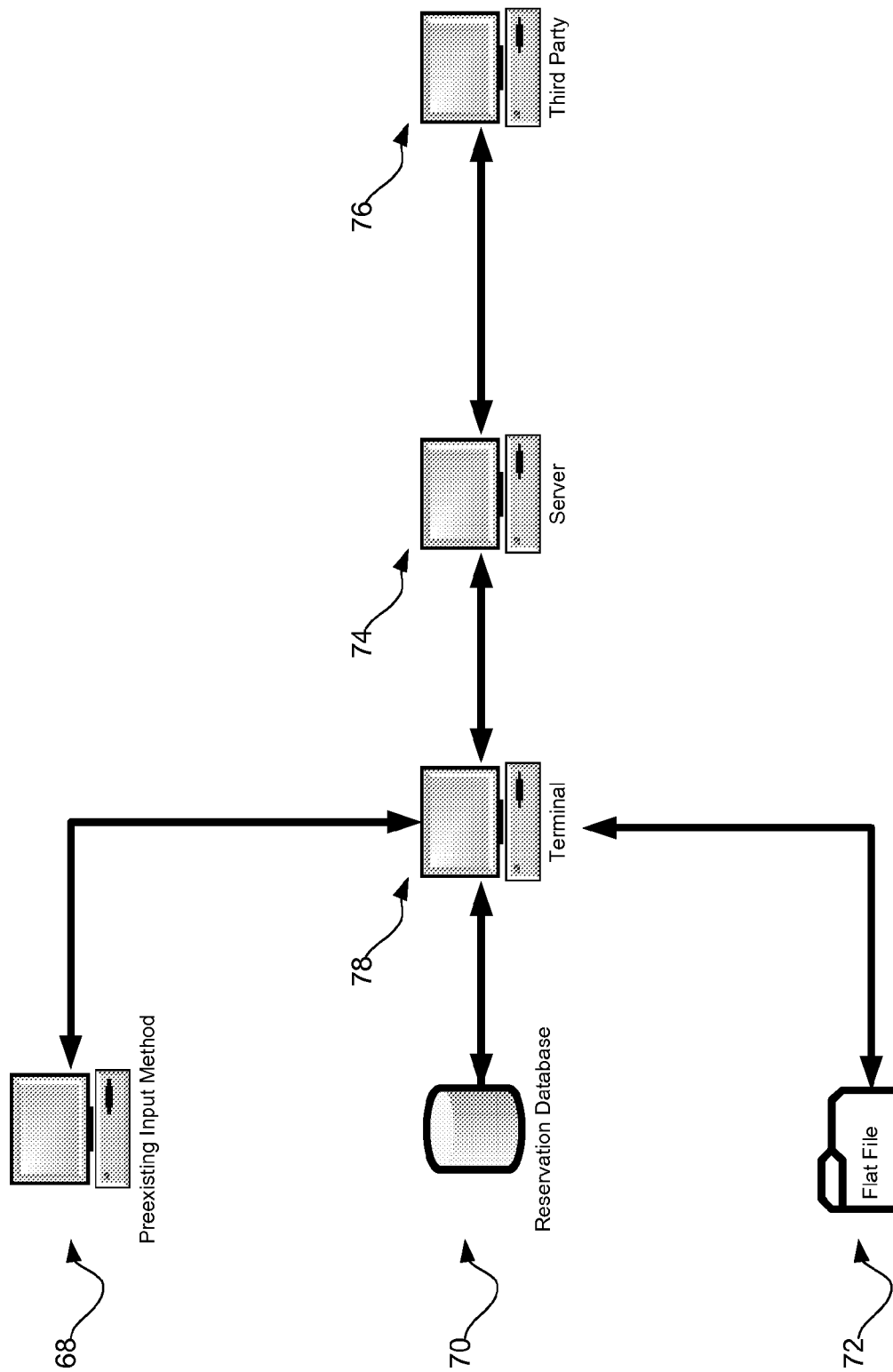
FIG. 4 displays a simplified example of a terminal configuration utilizing the Internet or a dedicated communication means.

Technology using the disclosed subject matter exists in different configurations based on the knowledge of those skilled in the art. A typical example illustrated in FIG. 4 utilizes the server to communicate messages from the terminal 78 operated by the client with the intended recipient 76. The terminal receives input from a preexisting communication protocol (SMPT/POP3 for example) 68, a database 70, or from a file 72. The message can be sent over a dedicated connection or over the Internet to the server 74 and on to the recipient 76. Internet communications have the option of encryption for added security. Three embodiments described here are Terminal, Terminal Server, and Terminal Conduit Server.

Figure 5:
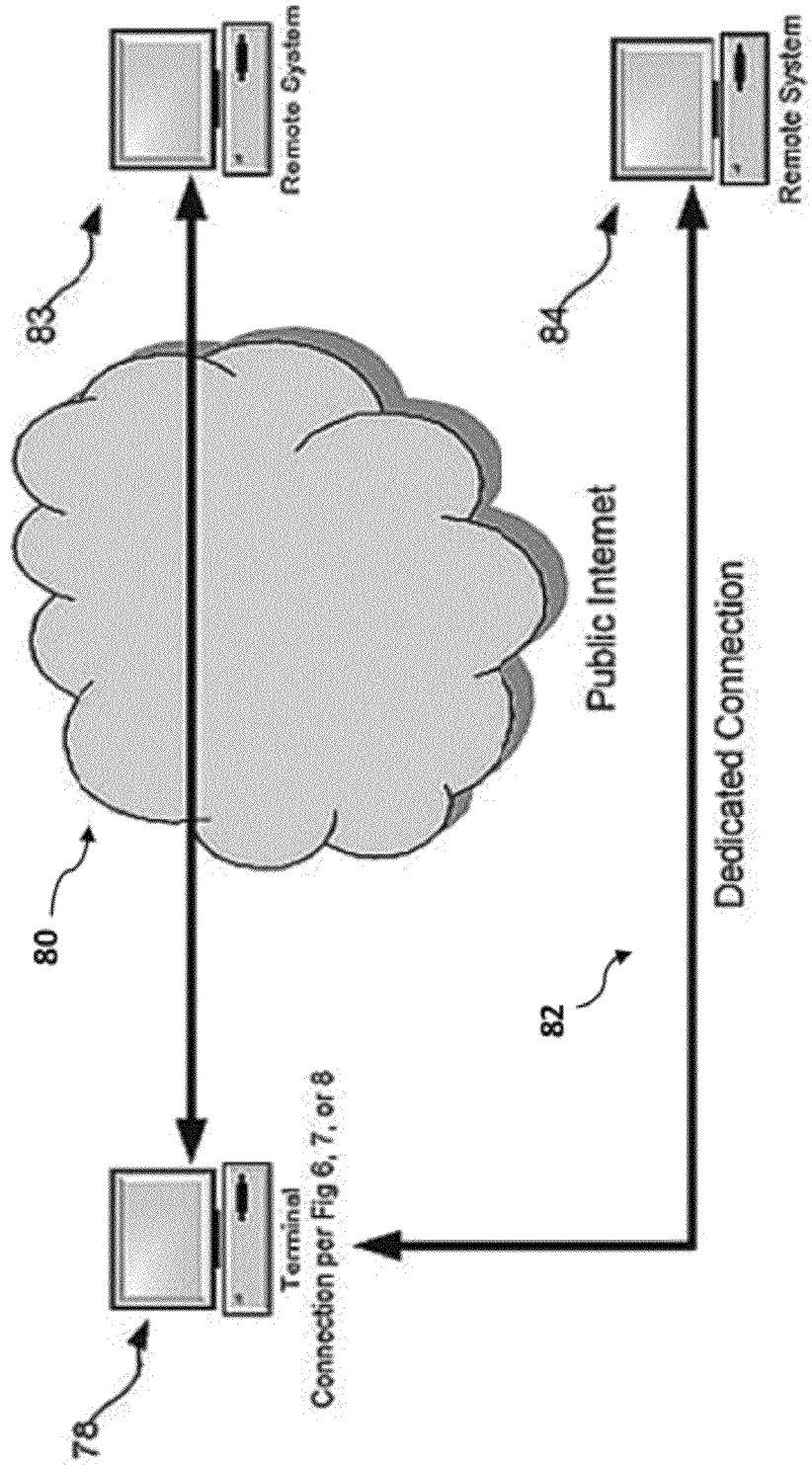
FIG. 5 is a simplified example of the Internet based connection versus direct connection utilized by the Terminal, Terminal Server, and Conduit Server configurations.

FIG. 5 shows common features of all three of the above referenced embodiments. All three embodiments use the terminal 78 to communicate with remote systems 83, 84. The communication occurs over the Internet 80 or over a dedicated communication line 82. The remote systems can be end points of the communication, or can be other distribution networks which disseminate the communication over their own systems to the intended end user.

Figure 6:
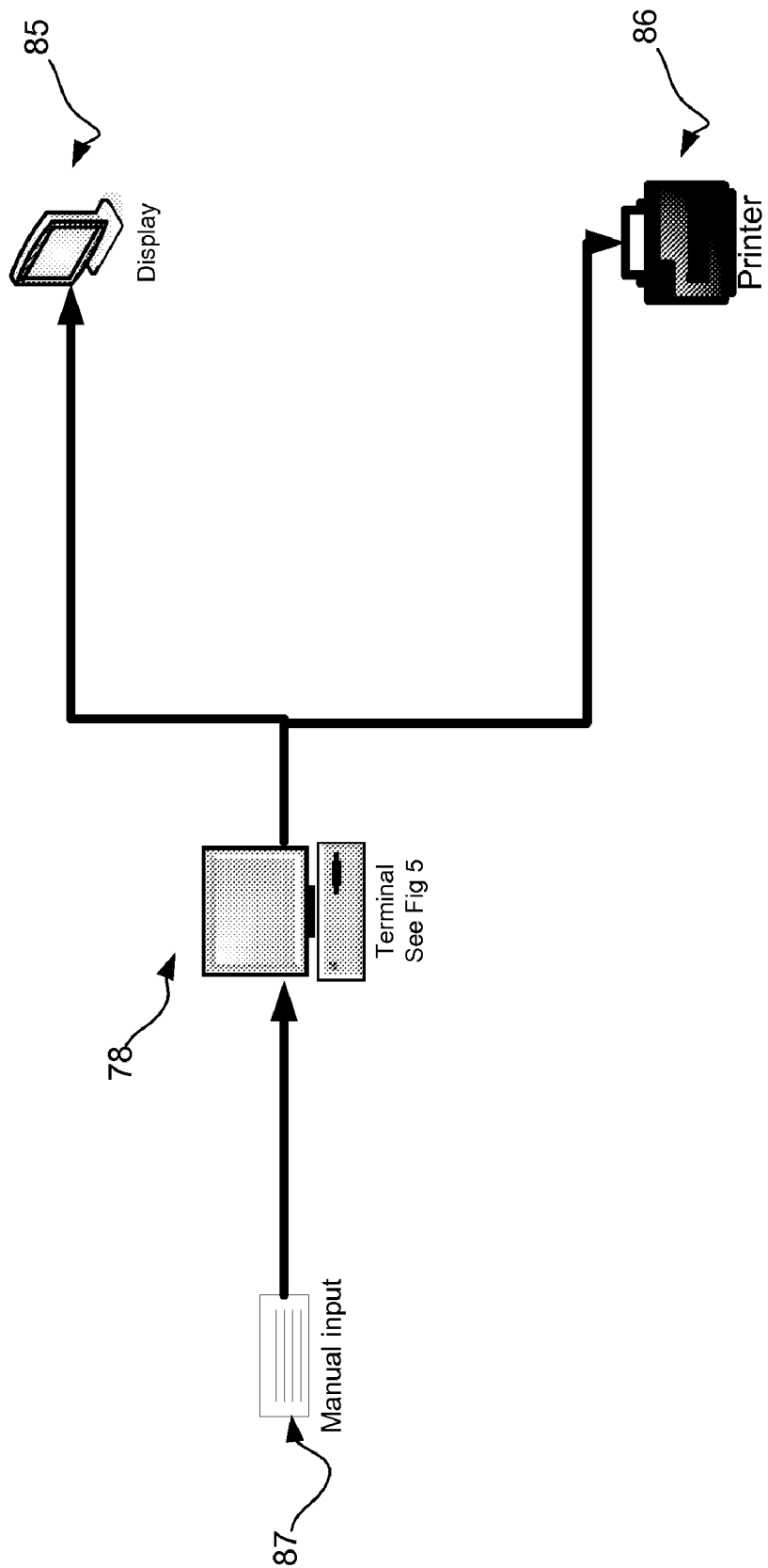
FIG. 6 discloses an example of the Terminal configuration of the disclosure.

The Terminal configuration shown in FIG. 6 involves the use of a terminal 78 that can communicate with third parties. Information 87 is directly input into the terminal 78, and the terminal can receive information from third parties via a display 85 or over a printer 86.

Figure 7:
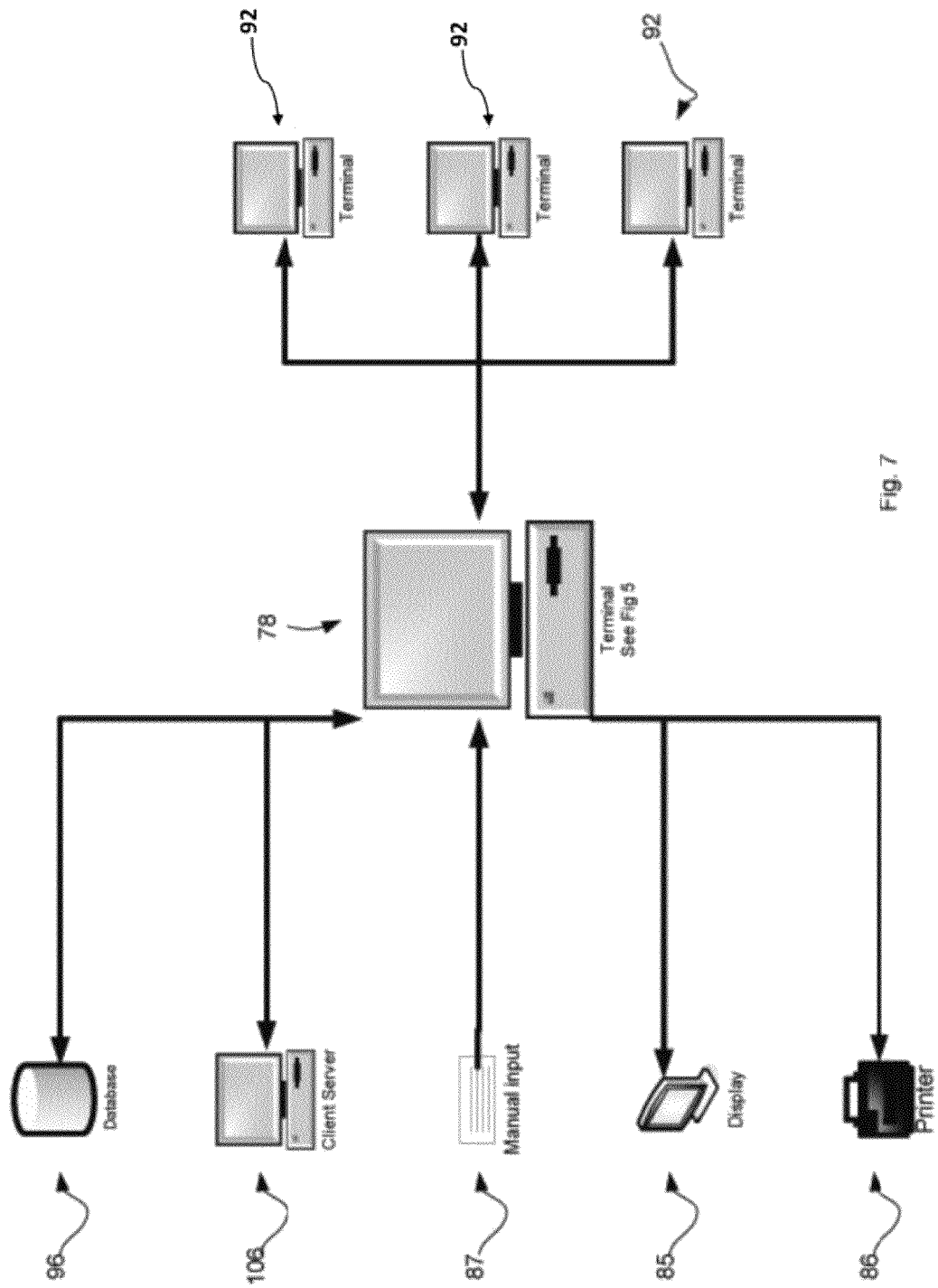
FIG. 7 portrays an example of the Terminal Server configuration of the disclosure.

Alternatively, FIG. 7 shows the Terminal Server configuration, which adds another level to the system disclosed in the Terminal configuration by having multiple subordinate terminals 92 connect to a terminal 78. All subordinate terminals 92 send and receive information from the terminal 78. Clients also send information to the terminal 78 via any other preexisting communication method used by the client 106 or from another data source, such as a database 96 or manual input 87. The terminal 78 again sends and receives information to third parties as disclosed in the Terminal configuration. The terminal 78 can display information via the terminal display 85 or via printer 86.

Figure 8:
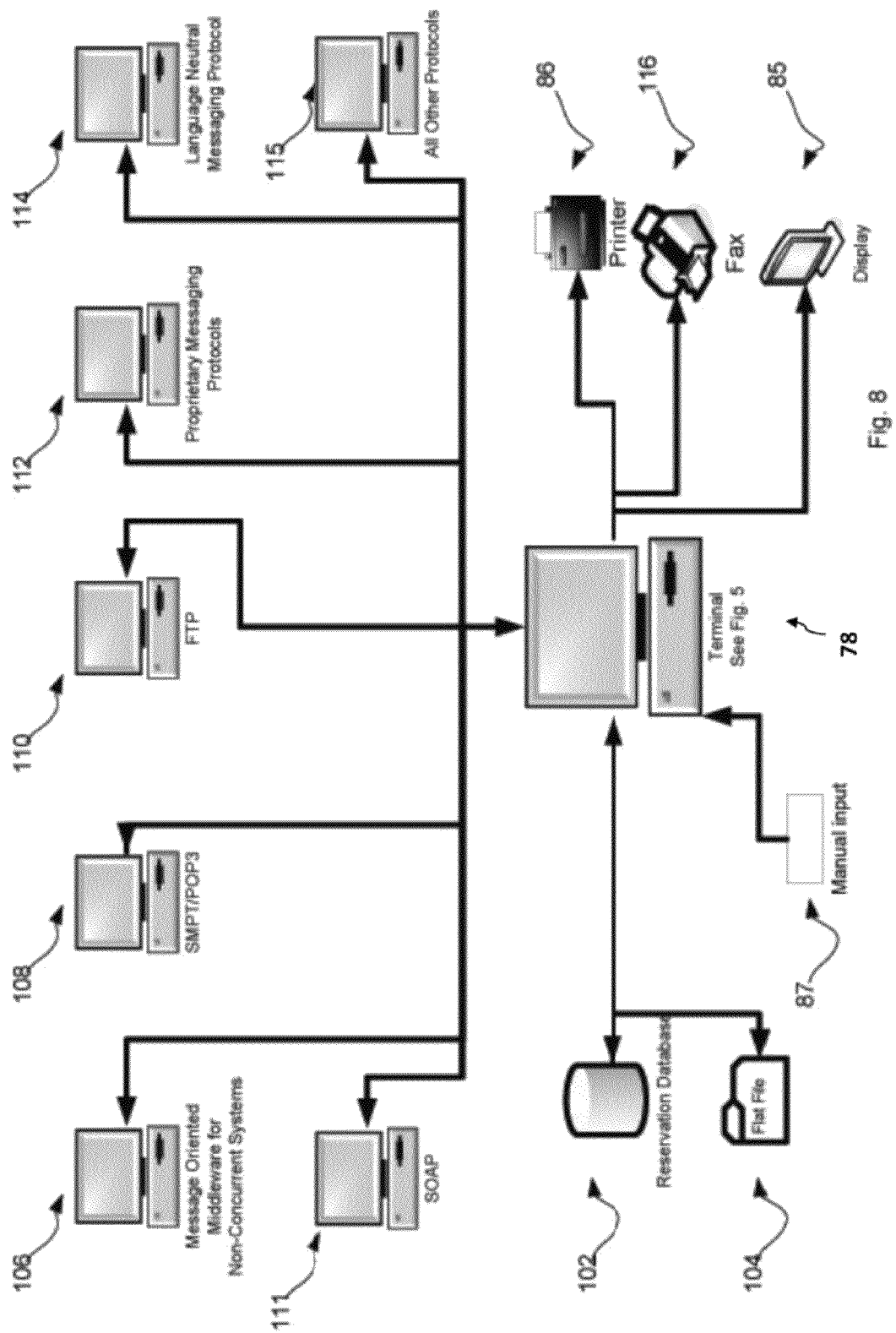
FIG. 8 presents an example of the Conduit Server configuration of the disclosure.

FIG. 8 shows the terminal in a Conduit Server embodiment. Various communication systems link to the terminal 78. Said communication systems can utilize any form of input method used by those skilled in the art, including manual input 87, a database 102, a file 104, a server using a message oriented middleware for non concurrent servers (such as the IBM MQ Series) 106, SMPT/POP3 108, FTP 110, SOAP 111, a propritary messenger protocol (such as MSMQ) 112, a language neutral messaging system (such as COM/DCOM) 114, or other communication protocols 115. In the Conduit Server, the communication systems use either AvCentric or non AvCentric protocols known by those skilled in the art. The communication systems send and receive information from the terminal 78, which in turn communicate messages from the terminal through the server, which routes the message to third parties. The terminal can also output messages via a terminal display 85, fax 116, or printer 86.

Figure 9:
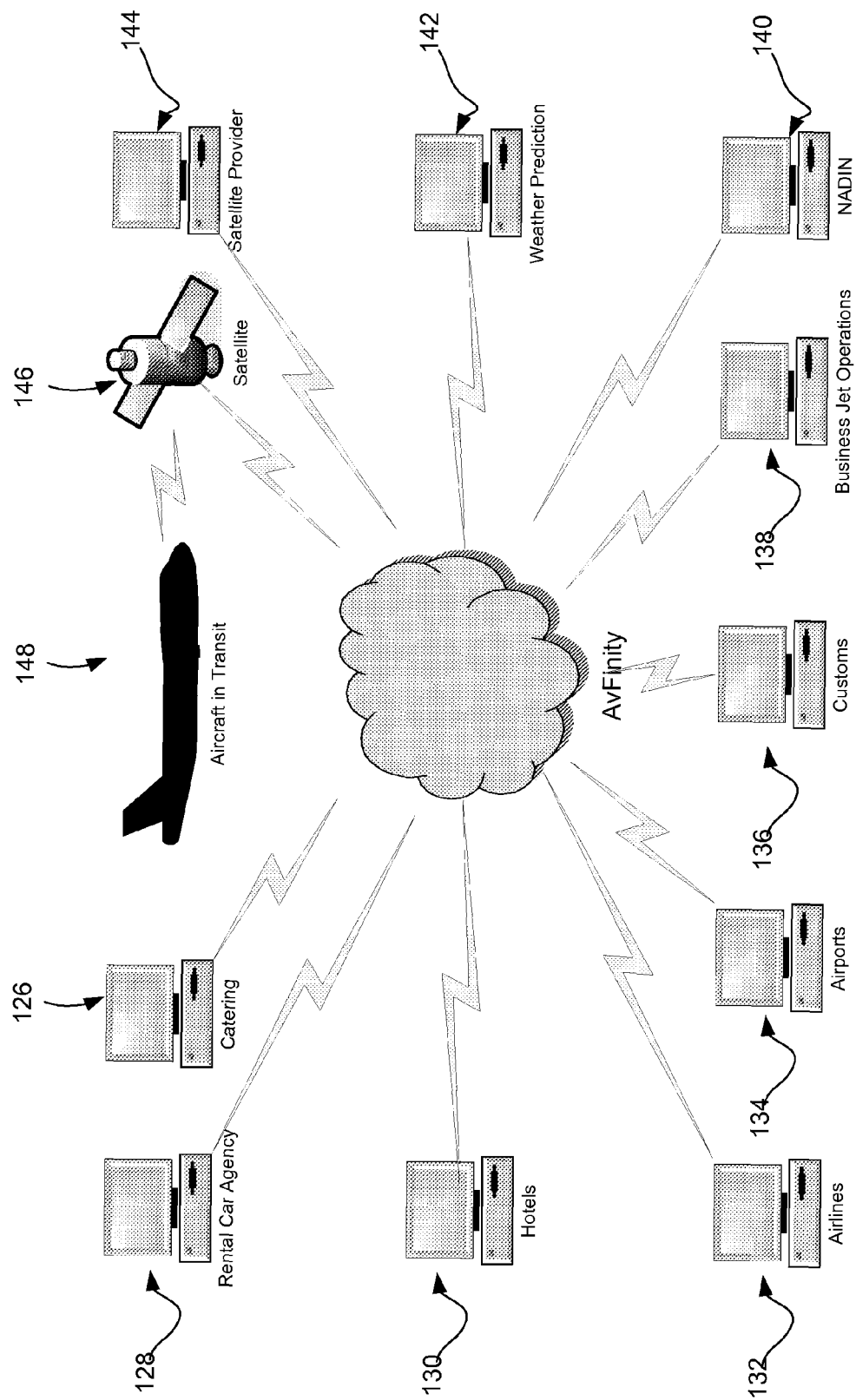
FIG. 9 provides an overview of how the invention allows large scale interconnectivity.

The interconnectivity facilitated by the server is shown in FIG. 9 by the various disclosed embodiments can allow parties in the aviation industry to communicate with one another. Service industries such as catering 126, car rentals 128, and hotels 130 can link with operational entities such as airlines 132, airports 134, customs 136, and business jet operations 138. The server also allows connectivity to technical support such as NADIN (National Airspace Data Interchange Network) 140, weather services 142, satellite providers 144, and satellites 146 that may connect to aircraft 148 in transit.

In addition to facilitating communication between different systems, the interface reduces or eliminates the need to interact with multiple communication systems to compile information available from the other communication systems. Due to the pre-existing incompatibility of communication systems, clients would have to use multiple communication system resources to compile information on a given aircraft or transaction. One system would display the passenger manifest, another would show the cargo manifest, and so on until all the information was displayed. An embodiment of interface allows the client to use one interface to see all the information on a given flight without the need to consult with each individual communication system to retrieve information exclusive to one system.

Another advantage of the disclosed subject matter over preexisting systems comes from the interface's ability to communicate in multiple communication formats without the need to maintain more than a single interface. Preexisting communication systems interact with clients in specific ways, some with dedicated terminals. Others use e-mail or other IT based methods. Even if all the communication systems used by the client are IT based, use of different systems necessitates the maintenance of multiple communication interfaces or equipment. The interface eliminates the need to maintain these separate communication systems to communicate with third parties. The interface allows the client to both send and receive through multiple communication systems via a single interface.

The disclosed subject matter can be embodied in an apparatus that interfaces with multiple communication systems, comprised of incoming information from a transmitting party, a set of instructions for receiving incoming information from a transmitting party, a set of instructions for determining the format of the incoming information from the transmitting party, a set of instructions for identifying the receiving party, a set of instructions for determining the format of outgoing information for the receiving party, a set of instructions for transforming the incoming information into the format required of the outgoing information, and a set of instructions for transmitting the outgoing information to the receiving party. The format of incoming information can be determined by an analysis of the incoming information or a profile associated with the transmitting party. The format of outgoing information can be determined from a profile associated with either the transmitting party or receiving party. The transmitting and receiving parties can be those involved in aircraft communications and coordination. The apparatus can be manipulated using a general purpose computer.

The preceding disclosure describes a method, system, and apparatus for interfacing multiple communication systems, comprising the following steps. The interface receives information from the client, followed by determination of the format of said information. The disclosed subject matter identifies the third party to receive the information and transforms the originally received information into a format compatible for the third party. The server then sends the converted information to the intended third party. The process allows communication between the client and third party in both directions.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for interfacing multiple aviation related communication systems and capable of bidirectional communication, comprising the steps of:

receiving incoming aviation related information from a plurality of transmitting parties, the parties associated with one or more aviation related communication systems, the one or more aviation communication systems transmitting information using a plurality of different formats, said incoming aviation related information being in a plurality of different formats;

determining a format of said incoming aviation related information from a plurality of possible formats of said incoming aviation related information from said plurality of transmitting parties;

identifying at least one receiving party;

determining a plurality of different outgoing formats of outgoing aviation related information for said at least one receiving party;

transforming said incoming aviation related information into at least one format required of said outgoing aviation related information; and transmitting said outgoing aviation related information to said at least one receiving party;

wherein at least one transmitting party may be one of said receiving parties in a subsequent aviation related information exchange, such that bidirectional communications may be accomplished.

2. The method of claim 1, further comprising the step of determining at least one format of said incoming aviation related information based on analysis of said incoming aviation related information.

3. The method of claim 1, further comprising the step of determining at least one format of said incoming aviation related information based on profiles associated with said transmitting party.

4. The method of claim 1, further comprising the step of determining at least one format of said outgoing aviation related information based on a profile associated with said transmitting party.

5. The method of claim 1, further comprising the step of determining at least one format of said outgoing aviation related information based on a profile associated with said at least one receiving party to whom the outgoing aviation related information is intended.

6. The method of claim 1, wherein said incoming aviation related information and outgoing aviation related information comprises aircraft communication and/or aircraft coordination information.

7. The method of claim 1, further comprising the step of transforming said incoming aviation related information into at least one format required of said outgoing aviation related information using a general purpose computer.

8. A non-transitory computer readable medium encoded with a program for interfacing multiple aviation related communication systems and capable of bidirectional communication, said program comprising the steps of:
   receiving incoming aviation related information from a plurality of transmitting parties, said incoming aviation related information being in a plurality of different formats;
   determining a plurality of different formats of said incoming, aviation related information from said plurality of transmitting parties;
   identifying at least one receiving party;
   determining the format of outgoing, aviation related information for said at least one receiving party, said outgoing aviation related information operable to be formatted to a plurality of different formats;
   transforming said incoming aviation related information into at least one format required of said outgoing aviation related information; and
   transmitting said outgoing aviation related information to said at least one receiving party;
   wherein at least one transmitting party may be one of said receiving parties in a subsequent aviation related information exchange, such that bidirectional communications may be accomplished.

9. The medium of claim 8, where said medium comprises a program, said program further comprising the step of determining at least one format of said incoming aviation related information based on analysis of said incoming aviation related information.

10. The medium of claim 8, where said medium comprises a program, said program further comprising the step of determining at least one format of said incoming aviation related information based on a profile associated with said transmitting party.

11. The medium of claim 8, where said medium comprises a program, said program further comprising the step of determining at least one format of said outgoing aviation related information based on a profile associated with said transmitting party.

12. The medium of claim 8, where said medium comprises a program, said program further comprising the step of determining at least one format of said outgoing aviation related information based on a profile associated with said at least one receiving party.

13. The medium of claim 8, where said medium contains a program, wherein said incoming and outgoing aviation related information comprises aircraft communications and/or coordination information.

14. The medium of claim 8, where said medium comprises a program, said program further comprising the step of transforming said incoming aviation related information into at least one format required of said outgoing aviation related information using a general purpose computer.

15. A system for interfacing multiple aviation related communication systems and capable of bidirectional communication, comprising:
   at least one transmitting communications device capable of transmitting aviation related information to another communications device;
   at least one receiving communications device capable of receiving aviation related information from another communications device;
   an identification device capable of identifying an incoming format associated with received incoming aviation related information from a plurality of different incoming formats from said at least one transmitting communications device, identifying at least one receiving communications device, and identifying a plurality of different outgoing aviation related information formats associated with the at least one receiving communications device; and
   a transforming communications device capable of transforming said incoming aviation related information into at least one format required of said outgoing aviation related information the at least one required format associated with the at least one receiving communication device;
   wherein at least one receiving communications device may be one of said transmitting communications devices in a subsequent aviation related information exchange, such that bidirectional communications may be accomplished.

16. The system of claim 15, where said system contains said transforming communications device, said transforming communications device also for determining the format of said incoming, aviation related information based on analysis of said incoming aviation related information.

17. The system of claim 15, where said system contains said transforming communications device, said transforming communications device also for determining the format of said incoming aviation related information based on a profile associated with said plurality of transmitting communications devices.

18. The system of claim 15, where said system contains said transforming communications device, said transforming communications device also for determining the format of said outgoing, aviation related information based on a profile associated with said plurality of transmitting communications devices to which the incoming aviation related information is intended.

19. The system of claim 15, where said system contains said transforming communications device, said transforming communications device also for determining the format of said outgoing aviation related information based on a profile associated with said plurality of receiving communications devices.

20. The system of claim 15, where said system contains said transforming communications device, said transforming communications device also for transforming communications protocols for the purpose of aircraft communications and/or coordination.

21. The system of claim 15, where said system contains said transforming communications device, said transforming communications device comprising a general purpose computer.

* * * * *